United States Patent [19]

Inamura

[11] Patent Number: 4,740,703

[45] Date of Patent: Apr. 26, 1988

[54] IONIZATION-TYPE SMOKE DETECTOR

[75] Inventor: Katsumasa Inamura, Menuma, Japan

[73] Assignee: Nohmi Bosai Kogyo Kabushiki Kaisha, Tokyo, Japan

[21] Appl. No.: 732,830

[22] PCT Filed: Sep. 4, 1984

[86] PCT No.: PCT/JP84/00421

§ 371 Date: Apr. 19, 1985

§ 102(e) Date: Apr. 19, 1985

[87] PCT Pub. No.: WO85/01110

PCT Pub. Date: Mar. 14, 1985

[30] Foreign Application Priority Data

Sep. 5, 1983 [JP] Japan ................................ 58-136610

[51] Int. Cl.[4] ................................................ G01T 1/18

[52] U.S. Cl. .................................. 250/385.1; 250/381

[58] Field of Search ................... 250/385 R, 381, 384, 250/382; 340/629

[56] References Cited

U.S. PATENT DOCUMENTS 4,234,877 11/1980 Moruyama et al. ................ 250/381

4,328,424 5/1982 O'Connor ........................... 250/384

FOREIGN PATENT DOCUMENTS 1299234 12/1972 United Kingdom ................ 250/385

54-112192 1/1978 Japan .................................. 250/384

0171660 10/1983 Japan .................................. 340/629

*Primary Examiner*—Janice A. Howell

*Assistant Examiner*—Richard Hanig

*Attorney, Agent, or Firm*—Tilton, Fallon, Lungmus

[57] ABSTRACT

In an ionization-type smoke detector wherein inner, intermediate and outer electrodes are supported on an insulating base, an inner ionization chamber and an outer ionization chamber being constituted by the inner and intermediate electrodes, and the intermediate and outer electrodes respectively, and a radioactive source provided to irradiate both of the ionization chambers, a detector is disclosed wherein the insulating base is formed with a through-hole to connect its upper and lower parts, the inner electrode being passed through the hole to be supported inside the insulating base at its upper portion, and the outer electrode is supported on the outside of the insulating base at its upper parts with an intervening substance being interposed therebetween, whereby the mutual creepage distances between the respective electrodes are elongated.

6 Claims, 2 Drawing Sheets

IONIZATION-TYPE SMOKE DETECTOR

TECHNICAL FIELD

This invention relates to an ionization-type smoke detector and, more particularly, to a constitution for increasing the insulation resistance between respective electrodes which is especially effective for a small size ionization-type smoke detector.

BACKGROUND ART

An ionization-type smoke detector is constituted so that both the inner and outer ionization chambers have a high resistance so that the insulation resistance between the respective electrodes must also be very high. For this reason an attempt has so far been made to increase the insulation resistance between the electrodes by corrugating the surface of the base on which each of the electrodes is mounted, thus lengthening the creepage distances between the electrodes.

Now an example of a conventional ionization-type smoke detector of this kind will be explained in reference to FIG. 1 of the attached drawings. In this drawing reference numeral 1 designates an insulating base the under surface of which is formed into concentric circles of corrugations. Below the surface of the insulating base 1 there are respectively supported an inner electrode 4 that is mounted together with a radioactive source 2 by a screw 3, an intermediate electrode 6 with a central opening 5, and a net- or grid-like air permeable outer electrode 7, whereby an inner ionization chamber 8 and an outer ionization chamber 9 are constituted by the inner and intermediate electrodes 4, 6, and intermediate and outer electrodes 6, 7, respectively. Further, in FIG. 1 the reference numeral 10 designates a circuit board of an insulating material which constitutes a circuit for detecting the electrical change in the outer ionization chamber 9, the outer periphery of the circuit board 10 being mounted on the upper part of the insulating base board 1 in contact therewith, and the respective electrodes 4, 6 and 7 are electrically connected to the circuit board 10. A rear cover 11 is mounted on the insulating base 1 at its upper rear side.

With such a constitution the creepage distances between the respective electrodes 4, 6, 7 become longer and the insulation resistances between the respective electrodes 4, 6 and 7 are respectively increased. However, like other detectors these ionization-type smoke detector are also now required to be of smaller size as the times demand. However, in this case there arises a defect that even if corrugations are formed on the under surface of the base 1 as shown in FIG. 1, the desired creepage distances cannot be obtained.

DISCLOSURE OF THE INVENTION

It is an object of the present invention to improve conventional ionization-type smoke detectors such as that shown in FIG. 1 so as to have smaller overall dimensions and yet to assure desired creepage distances between the inner, intermediate and outer electrodes, respectively.

The present invention is characterized in that in order to achieve the above object the support portions of the inner and outer electrodes are moved to other positions relative to the intermediate electrode so that the creepage distances between the respective electrodes can be easily lengthened, whereby sufficient insulation resistances can be assured between the respective electrodes.

BRIEF DESCRIPTION OF THE DRAWINGS

In FIGS. 2 to 4 the elements corresponding to those shown in FIG. 1 bear the same reference numerals as those in FIG. 1.

BEST MODE FOR CARRYING OUT THE INVENTION

Figure 1:
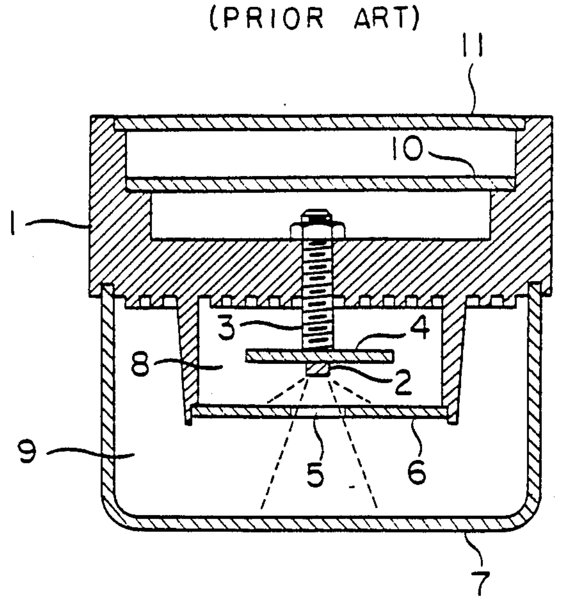
FIG. 1 (PRIOR ART)
FIG. 1 is a vertical sectional view of a conventional ionization-type smoke detector.
Figure 2:
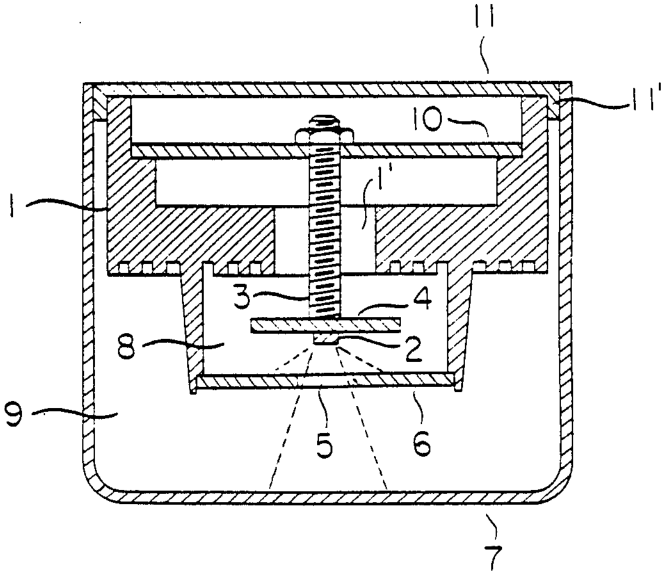
FIG. 2 is a vertical sectional view of one embodiment of the present invention.

First, the present invention will be explained in reference to FIG. 2 wherein an embodiment thereof is shown. Just as in FIG. 1 an intermediate electrode 6 having a central opening 5 is supported on the under surface of an insulating base 1 which is provided with many corrugations in the form of concentric circles, but there is a central through-hole 1' formed coaxially in the base and having a diameter larger than that of the screw 3, this hole communicating the upper and lower parts of the base 1, whereby an inner electrode 4 with a radioactive source 2 is supported on the circuit board 10 by the screw 3 passing through the through-hole 1'. The periphery of the rear cover 11 is bent so as to cover the upper portion of the outside of the insulating base 1 so that the outer electrode 7 is supported by the insulating base 1 through the bent portion 11' of the rear cover 11. Therefore, the mutual creepage distance between the inner and intermediate electordes 4, 6 is made all the more longer, because in addition to the upper and lower surfaces of the insulating base 1 the under surface of the circuit board 10 is included. Further the mutual creepage distance between the intermediate and outer electrodes 6, 7 is also made all the more longer due to the addition of the outer side surface of the insulating base 1.

Figure 3:
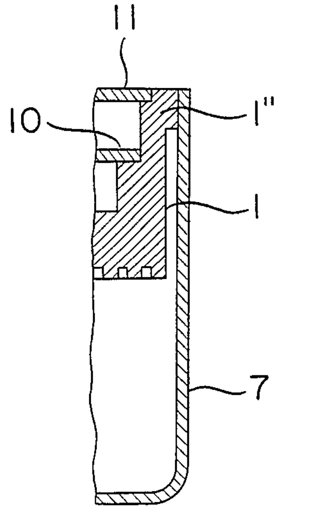
FIGS. 3 and 4 are vertical sectional views of the essential parts of the other embodiments of the outer electrode support portions relative to the insulating base respectively.
Figure 4:
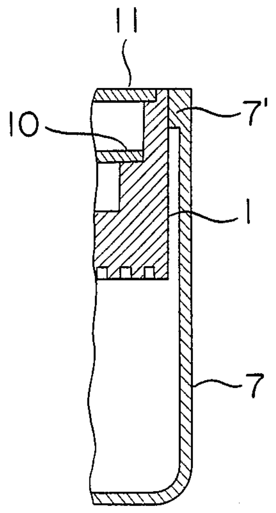

It is also true that if such corrugations as formed on the under surface of the insulating base 1 are also formed on its upper as well as side surfaces, etc. the creepage distance is made even longer. However, since according to the abovementioned constitution the creepage distances can be made sufficiently long compared to those in conventional devices without forming the surface of the insulating base 1 into corrugations, the respective surfaces of the insulating base 1 do not need to be corrugated as long as the desired creepage distances can be obtained. Although in the above embodiment, on supporting the outer electrode 7 on the insulating base 1 the bent portion 11' is adapted to be disposed therebetween so that the outer side surface of the insulating base 1 is added to the creepage distance between the intermediate and outer electrodes 6, 7, an integral protrusion 1" or 7' performing a similar function may be formed on the corresponding portions of the insulating base 1 or the outer electrode 7 respectively in place of the bent portion 11' as an intervening substance or spacer as shwon in FIGS. 3 and 4, respectively. However, in an embodiment wherein the rear cover 11 is made of a metal plate, if the bent portion 11' is made to be the intervening substance at the supporting part of the outer electrode 7, then the detector can be wholly covered with a metallic casing comprising the outer electrode 7 and the rear cover 11 so that the detector can be electromagnetically shielded, the detecting circuit constituted by the circuit board 10 can also be protected against external noises and the scattering of the radioactive source 2 at the time of a fire, etc. can also be prevented.

Thus, in accordance with the present invention, since the inner electrode is adapted to be supported by the circuit board above the insulating base through the communicating hole formed therein and the outer electrode is supported on the outside of the insulating base at a substantial distance relative to the intermediate electrode supported on the under surface of the insulating base, the creepage distances of the respective electrodes can be easily elongated. Therefore, since the insulation resistances between the respective electrodes can be sufficiently raised the present invention has, in particular, a prominent effect in the miniaturizing of detectors of this kind.

I claim:

1. An ionization-type smoke detector comprising an inner electrode (4), an intermediate electrode (6) and an outer electrode (7) supported on an insulating base (1), an inner ionization chamber (8) between said inner electrode (4) and said intermediate electrode (6), and an outer ionization chamber (9) between said intermediate electrode (6) and said outer electrode (7) respectively, a radioactive source (2) provided to irradiate both of said ionization chambers (8,9) an insulting circuit board (10) including a circuit for detecting an electrical change of said outer ionization chamber (9) connected to said respective electrodes (4,6,7), and a rear cover (11) covering the upper rear side of said insulating base (1), wherein the improvement comprises said insulating base (1) having a hole (1') extending therethrough, said inner electrode (4) extending through said hole (1') without contacting said base (1) and being supported by said insulating circuit board (10) within said insulating base (1) at its upper portion, said outer electrode (7) being supported on the outside of said insulating base (1) at the upper end thereof with an intervening spacer (1'',7',11') interposed therebetween to space the outside of said base (1) below said intervening spacer from said outer electrode (7), whereby the mutual creepage distances between said electrodes (4,6,7) are lengthened and the insulation resistances between said respective electrodes (4,6,7) are increased.

2. An ionization-type smoke detector as defined in claim 1 wherein said intervening spacer for said outer electrode (7) relative to said insulating base (1) is a bent portion of said rear cover (11).

3. An ionization-type smoke detector as defined in claim 1 wherein said intervening spacer for said outer electrode (7) relative to said insulating base (1) is a protrusion integrally formed with said insulating base (1).

4. An ionization-type smoke detector as defined in claim 1 wherein said intervening spacer for said outer electrode (7) relative to said insulating base (1) is a protrusion integrally formed with said outer electrode (7).

5. An ionization-type smoke detector as defined in claim 1 wherein said rear cover (11) is made of a metallic plate.

6. An ionization-type smoke detector as defined in claim 1 wherein the surface of said insulating base (1) is provided with corrugations.

* * * * *